2,711,406
MONOAZO DYESTUFFS

Achilles Conzetti, Basel, Switzerland, assignor to J. R. Geigy A. G., Basel, Switzerland, a Swiss firm No Drawing. Application February 5, 1953, Serial No. 335,405

Claims priority, application Switzerland February 5, 1952

7 Claims. (Cl. 260—200)

The present invention concerns the production of monoazo dyestuffs which are suitable for the dyeing of natural protein fibres and of synthetic polyamide fibres. When dyed from a neutral to weakly acid bath, they produce very even and fast to wet dyeings, particularly on wool.

It has been found that valuable monoazo dyestuffs are obtained if diazotised 1-amino-8-hydroxynaphthalene-3.6-disulphonic acids or their O-acyl derivatives are coupled with dibenzylaminobenzene compounds coupling in the p-position to the amino group and if necessary, saponifying the acyloxy group to the hydroxyl group. In this way, monoazo dyestuffs are obtained of the general formula:

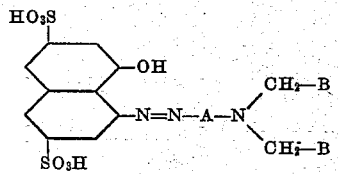

wherein A represents an unsubstituted or substituted p-phenylene radical and B represents a similar benzene radical.

Diazotised 1-amino-8-hydroxynaphthalene-3.6-disulphonic acids can be used in the process according to this invention as diazo components. More advantageous however, are their O-acyl derivatives, particularly the 1-amino-8-benzene sulphonyloxy and 1-amino-8-tosyloxy-3.6-disulphonic acid because their diazo compounds couple better.

As coupling components in the process according to the present invention can be used all reactive dibenzyl anilines, i. e. those with a free p-position to the amino group. It is advantageous to use such coupling components, the coupling activity of which is not reduced by electron-attracting substituents in the rings A and B. As well as unsubstituted dibenzylaniline, also the dibenzylaniline derivatives capable of coupling containing substituents such for example as low molecular alkyl, alkoxy and acylamino or phenoxy groups, may be employed. These substituents can be either in the ortho, or more advantageously, in the meta-position to the amino group in the benzene ring A, or they can occupy the 2.5-positions. The 3-alkoxy-1-dibenzylaminobenzene compounds, e. g. 3-methoxy- and the 3.6-dimethoxy-1-dibenzylaminobenzene are particularly easy coupling azo components which couple even with the non-acylated diazo compounds according to the present invention. Particularly pure and fast to light dyestuffs according to this invention are obtained however, if the benzene ring A is unsubstituted or if it is methyl substituted in the 2-, 3- or 2.5-positions. Substitution in the benzyl radicals has only a slight influence on the shade; apart from unsubstituted benzene rings which are advantageous, those substituted in the o- and p-position to the methylene linkage by groups such as alkyl and alkoxy groups may be employed.

A particularly valuable group of dyestuffs according to the present invention produced as described above corresponds to the following formula:

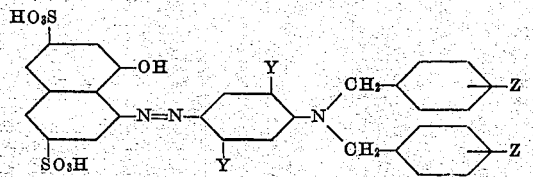

wherein Y represents hydrogen or the methyl group and Z represents hydrogen a low molecular alkyl or alkoxy group.

The dyestuffs are formed advantageously in a medium which is weakly acid to Congo red, preferably in, or in the presence of organic solubility promoters because of the difficult solubility of the coupling components. As such, the lower alcohols, ketones and fatty acids and, if necessary also pyridine bases which can be mixed with water may be employed.

The saponification of the acyloxy group, if present, to the hydroxyl group can be done, for example, in aqueous solution with diluted caustic alkalies at a raised temperature or in 70–90% sulphuric acid at room temperature; in the second case, the dyestuffs are afterwards converted into the alkali salts.

In the form of their alkali salts, the dyestuffs according to this invention are red to brown powders which dissolve in water with a yellowish red to blue-red colour. They are characterised by good drawing power onto wool from a weakly acid bath and they produce very level, pure, wool dyeings which have very good fastness to milling and sea water. Their property of dyeing the roots and tips of the wool very evenly should be particularly noted. In many cases the dyestuffs according to the present invention are very fast to light.

The following examples illustrated the invention, without limiting it in any way. Where not otherwise stated, parts are given as parts by weight and the temperatures are given in degrees centigrade. The relationship of parts by weight to parts by volume is as that of kilogrammes to litres.

Example 1

47.3 parts of the sodium salt of 1-amino-8-tosyloxynaphthalene-3.6-disulphonic acid are dissolved in 200 parts of hot water, the solution is cooled, 20 parts of concentrated hydrochloric acid are added at 20° and the whole is then quickly diazotised at 6° with a solution of 6.9 parts of sodium nitrite in 14 parts of water. The diazo compound is then added at 28–30° to a solution of 27.3 parts of dibenzylaminobenzene in 700 parts of ethanol. The mixture is kept with a weakly acid reaction to Congo red by the dropwise addition of sodium acetate solution. After stirring for some hours at 28–30° the dyestuff formation is complete. The alcohol is distilled off, the residue is neutralised with sodium carbonate and then caustic soda up to a concentration of 4% is added. After stirring for 1 hour at 80–85° the saponification of the tosyloxy to the hydroxyl group is complete. The solution is neutralised with hydrochloric acid, the formed dyestuff is salted out and after cooling, filtered off and dried.

The dyestuff, a light red powder, dissolves in water with a red colour and produces pure red dyeings on wool from a weakly acid bath. The dyeings have very good wet fastness properties and very good fastness to light.

A dyestuff with very similar properties is obtained if, in the above example instead of the dibenzylaminobenzene, 30.1 parts of di-(4'-methylbenzyl)-aminobenzene or 33.3 parts of di-(4'-methoxybenzyl)-aminobenzene are used.

Example 2

31.9 parts of the sodium salt of 1-amino-8-hydroxy-naphthalene-3,6-disulphonic acid are dissolved in 400 parts of hot water, the solution is cooled and 30 parts of concentrated hydrochloric acid are quickly added at 30°. The solution is diazotised at 0–2° with a solution of 6.9 parts of sodium nitrite in 15 parts of water whereupon the whole is stirred for 2 hours at 0–2°. The yellow suspension of the diazo compound is added at 30–32° to a warm solution of 33 parts of 2.5-dimethoxy-1-dibenzyl-aminobenzene in 600 parts of ethanol which has been prepared hot and the whole is stirred at this temperature. The reaction is kept weakly acid to Congo red by the dropwise addition of an aqueous sodium acetate solution until after 16 hours the diazo compound has disappeared. The suspension is heated, the alcohol is distilled off, the residue is neutralised with sodium carbonate and the dyestuff is salted out. After cooling, the dyestuff is drawn off under suction and dried. It is a brown-red powder which dissolves in water with a bluish-red colour. It dyes wool from a neutral to weakly acid bath in very level blue-red shades. The wool dyeings have very good wet fastness properties and fairly good fastness to light.

The same dyestuff is obtained if instead of 1-amino-8-hydroxynaphthalene-3.6-disulphonic acid, 47.3 parts of 1-amino-8-tosyloxynaphthalene-3.6-disulphonic acid are used and, on completion of the coupling, the tosyloxy group is saponified to the hydroxyl group as described in detail in Example 1.

Example 3

47.3 parts of 1-amino-8-tosyloxynaphthalene-3.6-disulphonic acid are diazotised in the manner described in Example 1. The diazo compound is poured at 28–30° into a solution obtained by dissolving 28.7 parts of 3-methyl-1-dibenzylaminobenzene in 250 parts of hot ethanol. The mixture is then made weakly acid to Congo red by the addition of 57 parts by volume of 40% sodium acetate solution and the whole is stirred at 28–30° until the diazo compound has disappeared, which is the case in a few hours. After distilling off the ethyl alcohol, the dyestuff solution is neutralised with sodium carbonate and so much caustic soda is added that a 4% caustic soda lye is produced. After stirring for 1 hour at 80–85° the saponification of the tosyloxy group to the hydroxyl group is complete. The whole is neutralised with hydrochloric acid, the dyestuff is salted out, cooled, and the dyestuff which has precipitated in the form of a red crystal powder is filtered off and dried.

The dyestuff is a red powder which dissolves in water with a red colour. Wool is dyed from a neutral to weakly acid bath in very clear, level red shades. The dyeings have excellent wet fastness properties and very good fastness to light.

Example 4

141.9 parts of 1-amino-8-tosyloxynaphthalene-3.6-disulphonic acid are diazotised as described; the diazo compound is poured at 30–32° into a solution of 113.7 parts of 2-(2'-methylphenoxy)-1-dibenzylaminobenzene in 1450 parts of ethanol. After stirring for an hour, care is taken to see that the reaction remains slightly acid to Congo red by the dropwise addition of 40% sodium acetate solution. The whole is stirred at 30° for a further 8–10 hours until the diazo compound has disappeared. The mixture is heated and the ethanol is distilled off. The tosyloxy group is saponified to the hydroxyl group after neutralising with sodium carbonate by the addition of as much caustic soda as will produce a 4% caustic soda lye. The saponification is complete after stirring for 1 hour at 80–85°. The hot dyestuff solution is neutralised by the dropwise addition of hydrochloric acid, the dyestuff is salted out, filtered off after cooling and dried. It is a light red powder which dyes wool from a neutral to weakly acid bath in clear, yellowish and very level shades. The wool dyeings have very good wet and light fastness properties.

If in the above example, instead of the 2-(2'-methylphenoxy)-1-dibenzylaminobenzene, 109.5 parts of 2-phenoxy-1-dibenzylaminobenzene are used, a dyestuff with very similar properties is obtained.

The phenoxy-dibenzylaminobenzene compounds used in this example are obtained from the corresponding primary amino compounds by heating with an excess of benzyl chloride in the presence of iodine as catalyst.

Example 5

100 parts of previously wetted wool yarn are entered at 40° into a bath containing 4000 parts of water, 2 parts of the monoazo dyestuff obtained according to Example 4, 10 parts of Glauber's salt and 2 parts of acetic acid. The bath is brought to the boil within half an hour, 1 part of formic acid is added and the bath is boiled for a further half hour. The yarn is then rinsed and dried. A very even yellowish-red clear wool dyeing is obtained which has very good wet and light fastness properties.

The dyestuffs given in the following table are obtained by the methods described in Examples 1 to 4.

| Diazo component | Coupling component | Shade of the dyestuff (if necessary saponified) on wool |
|---|---|---|
| 1-amino-8-tosyloxy-naphthalene-3.6-disulphonic acid. | 2.5-dimethyl-1-dibenzyl-aminobenzene. | light red. |
| 1-amino-8-hydroxy-naphthalene-3.6-disulphonic acid. | 3-methoxy-1-dibenzylami-nobenzene. | blue-red. |
| 1-amino-8-tosyloxy-naphthalene-3.6-disulphonic acid. | 2.5-dimethyl-1-di-(4'-methoxybenzyl)-amino-benzene. | light red. |
| Do | 2.5-dimethyl-1-di-(4'-methylbenzyl)-amino-benzene. | Do. |

What I claim is:

1. A monoazo dyestuff which contains only two sulphonic acid groups and which corresponds to the general formula:

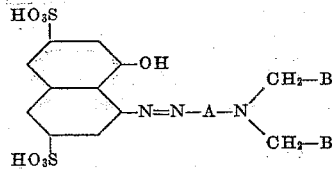

wherein A represents sulphonate-free aromatic radical of the benzene series bound in the 1:4 position, and B represents sulphonate-free aromatic radical of the benzene series.

2. A monoazo dyestuff corresponding to the general formula:

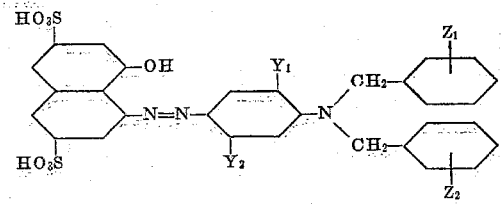

wherein $Y_1$ and $Y_2$ represent a member of the class consisting of H and $CH_3$, and $Z_1$ and $Z_2$ represent a member of the class consisting of H, $CH_3$ and $OCH_3$.

3. A monoazo dyestuff corresponding to the formula:

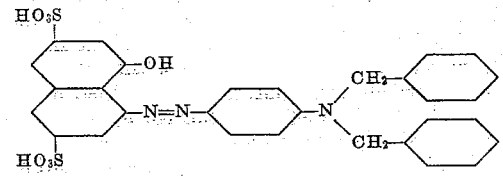

4. A monoazo dyestuff corresponding to the formula:
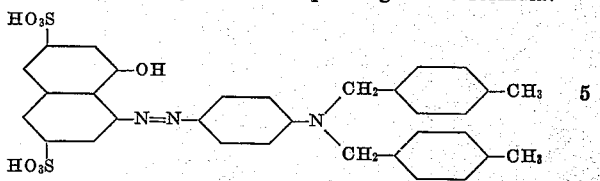
5. A monoazo dyestuff corresponding to the formula:
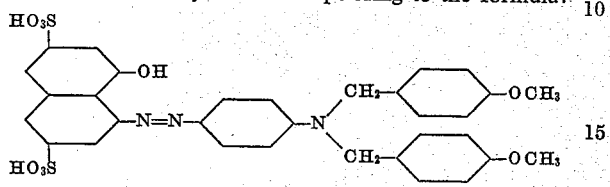
6. A monoazo dyestuff corresponding to the formula:
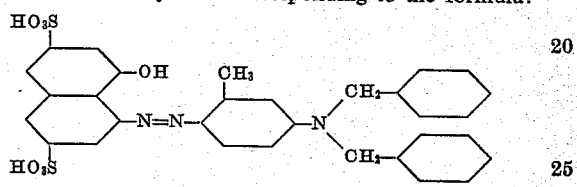
7. A monoazo dyestuff corresponding to the formula:
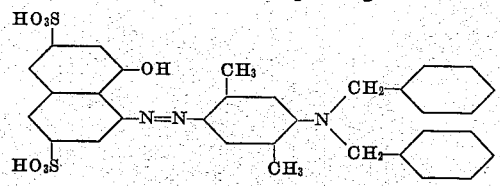
References Cited in the file of this patent
UNITED STATES PATENTS
| | | |
|---|---|---|
| 611,664 | Ulrich | Oct. 4, 1898 |
| 1,003,293 | Polikier | Sept. 12, 1911 |